US012609304B2

(12) United States Patent
Shi et al.

(10) Patent No.: US 12,609,304 B2
(45) Date of Patent: Apr. 21, 2026

(54) NEGATIVE ELECTRODE PLATE, SECONDARY BATTERY, BATTERY MODULE, BATTERY PACK AND POWER CONSUMING DEVICE

(71) Applicant: CONTEMPORARY AMPEREX TECHNOLOGY (HONG KONG) LIMITED, Hong Kong (CN)

(72) Inventors: Dongyang Shi, Ningde City (CN); Ning Chen, Ningde City (CN); Shuangshuang Liu, Ningde City (CN); Sitong Liu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 611 days.

(21) Appl. No.: 17/939,983

(22) Filed: Sep. 8, 2022

(65) Prior Publication Data

US 2023/0117186 A1     Apr. 20, 2023

Related U.S. Application Data

(63) Continuation of application No. PCT/CN2021/124798, filed on Oct. 19, 2021.

(51) Int. Cl.
H01M 4/48          (2010.01)
H01M 4/02          (2006.01)
           (Continued)

(52) U.S. Cl.
CPC ........... H01M 4/48 (2013.01); H01M 4/0404 (2013.01); H01M 4/583 (2013.01); (Continued)

(58) Field of Classification Search
CPC ........ H01M 4/362; H01M 4/386; H01M 4/58; H01M 4/583; H01M 10/0525; H01M 2004/027

See application file for complete search history.

(56) References Cited

U.S. PATENT DOCUMENTS 8,530,089 B2     9/2013  Im et al.
2006/0216604 A1*  9/2006  Kawase .............. H01M 4/0426
                                        429/231.95
                        (Continued)

FOREIGN PATENT DOCUMENTS

CN          112289997 A       1/2021
CN          112952035 A       6/2021
                (Continued)

OTHER PUBLICATIONS

Shui et al, Design optimization of battery pack enclosure for electric vehicle. Structural and Multidisciplinary Optimization. 58, 331-347 (Year: 2018).*

(Continued)

*Primary Examiner* — Marla D Mcconnell
*Assistant Examiner* — Julia S Caserto
(74) *Attorney, Agent, or Firm* — XSENSUS LLP

(57)          ABSTRACT

A negative electrode plate includes a current collector and a coating applied to at least one surface of the current collector, the coating comprising a negative electrode active material and a metal powder, wherein the electrode potential of the metal powder in the coating relative to lithium may be between 1.6 and 3.5 V, the negative electrode active material may be a silicon-based material, and relative to the total weight of the silicon-based material and the metal powder, the proportion by weight of the metal powder may be 5 to 20% and the proportion by weight of the silicon-based material may be 80 to 95%.

10 Claims, 3 Drawing Sheets

(51) Int. Cl.
　　*H01M 4/04*　　　　(2006.01)
　　*H01M 4/583*　　　(2010.01)
　　*H01M 10/0525*　　(2010.01)

(52) U.S. Cl.
　　CPC .. *H01M 10/0525* (2013.01); *H01M 2004/021*
　　　　　　(2013.01); *H01M 2004/027* (2013.01)

(56) References Cited

U.S. PATENT DOCUMENTS

| | | | | |
|---|---|---|---|---|
| 2009/0179181 | A1* | 7/2009 | Zhang | H01B 1/16 |
| | | | | 252/503 |
| 2011/0206987 | A1 | 8/2011 | Im et al. | |
| 2012/0326500 | A1* | 12/2012 | Hirose | H01M 4/5825 |
| | | | | 429/231.95 |
| 2016/0308196 | A1* | 10/2016 | Matsubara | H01M 10/0525 |
| 2017/0077503 | A1* | 3/2017 | Erickson | H01M 10/052 |
| 2018/0069237 | A1* | 3/2018 | Matsubara | H01M 4/0488 |
| 2018/0375094 | A1* | 12/2018 | He | C01B 33/021 |
| 2019/0157723 | A1* | 5/2019 | Suzuki | H01M 10/0562 |
| 2020/0365878 | A1 | 11/2020 | Ishikawa et al. | |
| 2021/0253437 | A1 | 8/2021 | Kim et al. | |
| 2022/0302437 | A1* | 9/2022 | Choi | H01M 4/0404 |

FOREIGN PATENT DOCUMENTS

| | | |
|---|---|---|
| CN | 113169318 A | 7/2021 |
| JP | 2005-183264 A | 7/2005 |
| JP | 2006-338993 A | 12/2006 |
| JP | 2007042393 A | 2/2007 |
| JP | 2013-008586 A | 1/2013 |
| JP | 2013-55006 A | 3/2013 |
| WO | 2019/031516 A1 | 2/2019 |

OTHER PUBLICATIONS

Standard electrode potentials table.*
Sugimoto et al. Application of bis(fluorosulfonyl)imide-based ionic liquid electrolyte to siliconânickelâcarbon composite anode for lithium-ion batteries. Journal of Power Sources. 195, 613-6156 (Year: 2010).*
Zhang et al. Enhancing electrochemical properties of silicon-graphite anodes by the introduction of cobalt for lithium-ion batteries. Journal of Power Sources. 290, 71-79 (Year: 2015).*
Lee et al. Journal of Materials Chemistry A. 2, 1589-1626 (Year: 2014).*
Egologix.*
Saw, L.H. et al Integration issues of lithium-ion battery into electric vehicles battery pack. Journal of Cleaner Production. 113, 1032-1045 (Year: 2016).*
Lee et al. Novel synthesis of high performance anode materials for lithium-ion batteries (LIBs). Journal of Materials Chemistry A. 2, 1589-1626 (Year: 2014).*
Friedman, D. National Research Council (US) Chemical Sciences Roundtable. The Role of the Chemical Sciences in Finding Alternatives to Critical Resources: A Workshop Summary. Washington (DC): National Academies Press (US); 2012. 6, Critical Materials in Large-Scale Battery Applications. p. 37-43 (Year: 2012).*
Sugimoto T et al: "Application of bis(fluorosulfonyl)imide-based ionic liquid electrolyte to silicon-nickel-carbon composite anode for lithium-ion batteries", Journal of Power Sources, Elsevier, Amsterdam, NL, vol. 195, No. 18, Jan. 13, 2010, pp. 6153-6156.
"a Basic Guide to Particle Characterization", Malvern Instruments worldwide—White Paper, May 2, 2012 , pp. 1-26.
Extended European Search Report issued Apr. 16, 2024 in European Patent Application No. 21928336.3.
International Search Report and Written Opinion mailed on Apr. 27, 2022, received for PCT Application PCT/CN2021/124798, filed on Oct. 19, 2021, 17 pages including English Translation.
Geng et al., "Preparation and electrochemical performance of ball milling SiOx/(Cu,Ni) anode materials for lithium-silicon batteries", Journal of Materials Science: Materials in Electronics, May 28, 2020, 10 pages.
Office Action issued Jan. 9, 2024 in Japanese Patent Application No. 2022-554688 with computer-generated English translation thereof.

* cited by examiner

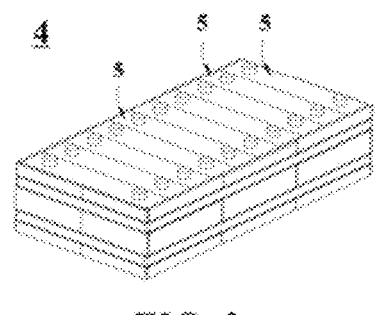
*FIG. 3*
*FIG. 4*
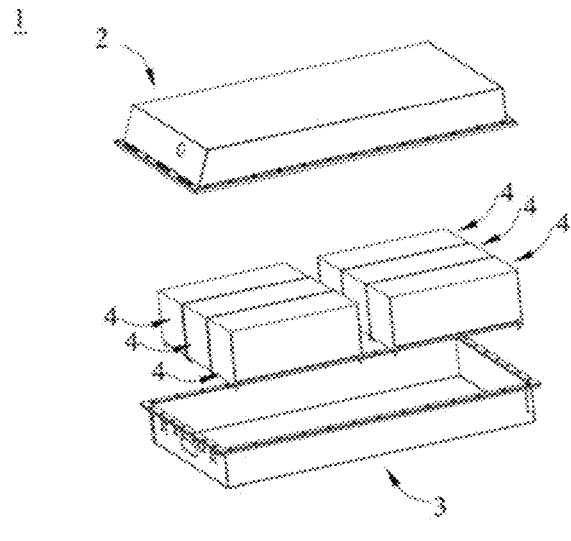
*FIG. 5*

NEGATIVE ELECTRODE PLATE, SECONDARY BATTERY, BATTERY MODULE, BATTERY PACK AND POWER CONSUMING DEVICE

CROSS-REFERENCE TO RELATED APPLICATION

The present application is a continuation of International Application No. PCT/CN2021/124798, filed Oct. 19, 2021, the entire content of which is incorporated herein by reference in its entirety.

TECHNICAL FIELD

The present application relates to the technical field of lithium-ion secondary batteries, and in particular to a negative electrode plate, a secondary battery, a battery module, a battery pack and a power consuming device.

BACKGROUND ART

In recent years, with the increasing application range of lithium-ion secondary batteries, lithium-ion batteries are widely used in energy storage power systems such as hydroelectric, thermal, wind and solar power stations, as well as electric tools, electric bicycles, electric motorcycles, electric vehicles, military equipment, aerospace and other fields. Due to the great development of lithium-ion secondary batteries, higher requirements have also been placed on the lithium-ion secondary batteries in terms of energy density, cycle performance, safety performance, etc. In addition, due to the increasingly limited choice of negative electrode active materials, silicon-based materials are considered to be the best choice to meet high energy density requirements.

However, for silicon-based materials, a solid electrolyte interface film (SEI film) will be formed on the particle surface during the first charge and discharge, and the SEI film will continuously decompose and release heat, degrading the safety performance of lithium-ion secondary batteries. Therefore, the safety performance of the existing lithium-ion secondary batteries using silicon-based materials still needs to be improved.

SUMMARY

Technical Problems to be Solved by the Disclosure

The present application has been made in view of the above problems, and an objective of the present application is to provide a negative electrode plate. The electrode potential of a metal powder contained in the negative electrode plate relative to lithium is between 1.5 and 3.5 V. Therefore, extensive metal evolution can occur before the negative electrode plate reaches the copper evolution potential, which causes a short circuit in the battery, so that a secondary battery passes an over-discharge test, without affecting the capacity of the secondary battery.

Technical Solutions for Solving Problems

In order to achieve the above objective, the present application provides a negative electrode plate, a secondary battery, a battery module, a battery pack and a power consuming device.

A first aspect of the present application provides a negative electrode plate comprising: a current collector and a coating applied to at least one surface of the current collector, the coating comprising a negative electrode active material, a metal powder, a conductive agent and a binder, wherein the electrode potential of the metal powder in the coating relative to lithium is between 1.6 and 3.5 V, the negative electrode active material is a silicon-based material, and relative to the total weight of the silicon-based material and the metal powder, the proportion by weight of the metal powder is 5 to 20% and optionally 5 to 15% and the proportion by weight of the silicon-based material is 80 to 95% and optionally 85% to 95%.

Therefore, in the present application, by adding a metal powder with an electrode potential relative to lithium of between 1.6 and 3.5 V in the negative electrode plate, during the over-discharge process of the battery, when the negative electrode potential reaches the oxidation potential of the metal powder, the metal powder can be oxidized to metal ions prior to a copper foil current collector, and then the metal ions pass through a separator to allow reduction and metal evolution on the surface of the positive electrode plate, and the separator is pierced, causing a short circuit in the lithium-ion secondary battery, so that the lithium-ion secondary battery passes an over-discharge test without the capacity of the lithium-ion secondary battery being affected. In the over-discharge test for the lithium-ion secondary battery, the lithium-ion secondary battery is fully charged with a constant current at 0.33 C rate to 4.25 V, and then charged with a constant voltage to 0.05 C, allowed to stand for 1 h, discharged at 1 C rate for 90 min, and observed at room temperature for 1 h. If the battery does not burn or explode, the lithium-ion secondary battery is considered to have passed the over-discharge test.

And also, in the present application, by using the above proportions by weight of the metal powder and the silicon-based material, it is ensured that during the over-discharge test, the negative electrode plate has a sufficient amount of metal evolution and the separator is pierced to cause short circuits inside the lithium-ion secondary battery, while the excessive influence of the metal powder in the coating of the negative electrode plate on the gram capacity of the negative electrode is minimized, thereby reducing the adverse effect on the energy density of the lithium-ion secondary battery.

In any embodiment, the metal powder is one or more of Mn, Cr, Zn, Ga, Fe, Cd, Co, Ni, Tl, In, Sn, and Pb, and optionally one or more of Mn, Co, Fe and Cr, and further optionally, the metal powder has a Dv50 of 20 nm to 20 μm, and optionally 50 nm to 10 μm.

Therefore, in the present application, by selecting a metal element with an electrode potential relative to lithium of between 1.6 and 3.5 V, the lithium-ion secondary battery using the negative electrode plate of the present application can pass the over-discharge test. From the perspective of the safety performance and service life of the lithium-ion secondary battery, 1.6 V is selected as the lower limit of the electrode potential relative to lithium. The negative electrode potential of the lithium-ion secondary battery can reach around 1.5 V under extreme conditions, so the electrode potential value of the above metal powder to lithium should be greater than 1.5 V. In addition, copper foil is usually chosen as a current collector in the negative electrode plate, and the oxidation potential of the copper foil current collector is around 3.6 V, so the electrode potential of the metal powder to lithium should be lower than 3.5 V to improve the pass rate in the over-discharge test of the lithium-ion secondary battery. And also, from the perspective of the processing requirements of the negative electrode plate, when the Dv50 of the metal powder is within the above range, agglomeration of the slurry or scratches of the current collector during coating can be avoided.

In any embodiment, the silicon-based material is at least one of $SiO_x$ and a mixture of $SiO_x$ and graphite, wherein relative to the total weight of the silicon-based material, the proportion by weight of the $SiO_x$ is 10 to 30% and the proportion by weight of the graphite is 70 to 90%, where in the $SiO_x$, $0 \leq x < 2$. Optionally, the Dv50 of the $SiO_x$ is 1-10 μm, and/or the Dv50 of the graphite is 3-20 μm. Therefore, from the perspective of balancing the energy density and cycle performance of the lithium-ion secondary battery, the above silicon-based material is selected as the negative electrode active material. When the Dv50 of the $SiO_x$ and the graphite is within the above ranges, the $SiO_x$ and the graphite are easy to disperse in the slurry, which is beneficial to the subsequent coating process.

In any embodiment, in the coating, the total proportion by weight of the silicon-based material and the metal powder is 95-99% relative to the total weight of the coating. Therefore, when the total proportion by weight of the silicon-based material and the metal powder is within the above range, the negative electrode plate not only is loaded with a sufficient amount of the silicon-based material as the negative electrode active material, but also contains an appropriate amount of the metal powder, so that the lithium-ion secondary battery comprising the negative electrode plate has high energy density and can pass the over-discharge test.

A second aspect of the present application provides a secondary battery comprising the negative electrode plate of the first aspect of the present application.

A third aspect of the present application provides a battery module comprising the secondary battery of the second aspect of the present application.

A fourth aspect of the present application provides a battery pack comprising the battery module of the third aspect of the present application.

A fifth aspect of the present application provides a power consuming device comprising at least one selected from the secondary battery of the second aspect of the present application, the battery module of the third aspect of the present application, or the battery pack of the fourth aspect of the present application.

Effect

The present application provides a negative electrode plate, a secondary battery, a battery module, a battery pack and a power consuming device. The coating of the negative electrode plate of the present application comprises a silicon-based material as a negative electrode active material and a metal powder with an electrode potential relative to lithium of between 1.6 and 3.5 V, the silicon-based material having a large gram capacity, thereby improving the energy density of the lithium-ion secondary battery comprising the negative electrode plate. The addition of the metal powder improves the pass rate in the over-discharge test of the lithium-ion secondary battery without affecting the capacity of the lithium-ion secondary battery, thus improving the safety performance of the lithium-ion secondary battery.

BRIEF DESCRIPTION OF THE DRAWINGS

The scope of the present disclosure is best understood from the following detailed description of exemplary embodiments when read in conjunction with the accompanying drawings.

FIG. 3 is a schematic diagram of a battery module according to an embodiment of the present application.

FIG. 4 is a schematic diagram of a battery pack according to an embodiment of the present application.

FIG. 5 is an exploded view of the battery pack according to the embodiment of the present application as shown in FIG. 4.

LIST OF REFERENCE NUMERALS

Figure 1:
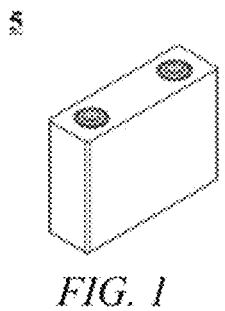
FIG. 1 is a schematic diagram of a secondary battery according to an embodiment of the present application.

1 battery pack; 2 upper box body; 3 lower box body; 4 battery module; 5 secondary battery; 51 housing; 52 electrode assembly; and 53 top cover assembly.

DETAILED DESCRIPTION OF EMBODIMENTS

Hereinafter, embodiments of the negative electrode plate, the secondary battery, the battery module, the battery pack, and the electrical device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4, and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present).

Negative Electrode Plate

In one embodiment of the present application, the present application provides a negative electrode plate comprising a current collector and a coating applied to at least one surface of the current collector, the coating comprising a negative electrode active material, a metal powder, a conductive agent and a binder, wherein the electrode potential of the metal powder in the coating relative to lithium is between 1.6 and 3.5 V, the negative electrode active material is a silicon-based material, and relative to the total weight of the silicon-based material and the metal powder, the proportion by weight of the metal powder is 5 to 20% and optionally 5 to 15% and the proportion by weight of the silicon-based material is 80 to 95% and optionally 85% to 95%.

Although the mechanism is not yet clear, the applicant has unexpectedly discovered through a large number of experiments: in the present application, by adding a metal powder with an electrode potential relative to lithium of between 1.6 and 3.5 V in the negative electrode plate, during the over-discharge process of the battery, when the negative electrode potential reaches the oxidation potential of the metal powder, the metal powder can be oxidized to metal ions prior to a copper foil current collector, and then the metal ions pass through a separator to allow reduction and metal evolution on the surface of the positive electrode plate, and the separator is pierced, causing a short circuit in the lithium-ion secondary battery, so that the lithium-ion secondary battery passes an over-discharge test without the capacity of the lithium-ion secondary battery being affected, thus improving the safety performance of the lithium-ion secondary battery. In the over-discharge test for the lithium-ion secondary battery, the lithium-ion secondary battery is fully charged with a constant current at 0.33 C rate to 4.25 V, and then charged with a constant voltage to 0.05 C, allowed to stand for 1 h, discharged at 1 C rate for 90 min, and observed at room temperature for 1 h. If the battery does not burn or explode, the lithium-ion secondary battery is considered to have passed the over-discharge test.

And also, in the present application, by using the above proportions by weight of the metal powder and the silicon-based material, it is ensured that during the over-discharge test, the negative electrode plate has a sufficient amount of metal evolution and the separator is pierced to cause short circuits inside the lithium-ion secondary battery, while the excessive influence of the metal powder in the coating of the negative electrode plate on the gram capacity of the negative electrode is minimized, thereby reducing the adverse effect on the energy density of the lithium-ion secondary battery.

In some embodiments, the metal powder is one or more of Mn, Cr, Zn, Ga, Fe, Cd, Co, Ni, Tl, In, Sn, and Pb, and optionally Mn, Co, Fe and Cr, and further optionally, the metal powder has a Dv50 of 20 nm to 20 μm, and optionally 50 nm to 10 μm.

Therefore, in the present application, by selecting a metal element with an electrode potential relative to lithium of between 1.6 and 3.5 V, it is guaranteed that the lithium-ion secondary battery using the negative electrode plate of the present application can pass the over-discharge test. From the perspective of the safety performance and service life of the lithium-ion secondary battery, 1.6 V is selected as the lower limit of the electrode potential relative to lithium. The negative electrode potential of the lithium-ion secondary battery can reach around 1.5 V under extreme conditions, so the electrode potential value of the above metal powder to lithium should be greater than 1.5 V. In addition, copper foil is usually chosen as a current collector in the negative electrode plate, and the oxidation potential of the copper foil current collector is around 3.6 V, so the electrode potential of the metal powder to lithium should be lower than 3.5 V to improve the pass rate in the over-discharge test of the lithium-ion secondary battery. And also, from the perspective of the processing requirements of the negative electrode plate, when the Dv50 of the metal powder is within the above range, agglomeration of the slurry or scratches of the current collector during coating can be avoided.

In some embodiments, the silicon-based material is at least one of $SiO_x$ and a mixture of $SiO_x$ and graphite, wherein relative to the total weight of the silicon-based material, the proportion by weight of the $SiO_x$ is 10 to 30% and the proportion by weight of the graphite is 70 to 90%, and optionally, the Dv50 of the $SiO_x$ is 1-10 μm, and/or the Dv50 of the graphite is 3-20 μm. Herein, in the $SiO_x$, $0 \le x < 2$. Therefore, from the perspective of ensuring the energy density and cycle performance of the lithium-ion secondary battery, the present application selects the above silicon-based material as the negative electrode active material. When the Dv50 of the $SiO_x$ and the graphite is within the above ranges, the silicon-based material and the graphite are easy to disperse in the slurry, which is beneficial to the subsequent coating process.

In some embodiments, in the coating, the total proportion by weight of the silicon-based material and the metal powder is 95-99% relative to the total weight of the coating. Therefore, when the total proportion by weight of the silicon-based material and the metal powder is within the above range, the negative electrode plate not only is loaded with the enough silicon-based material as the negative electrode active material, but also contains a sufficient amount of the metal powder, so that the lithium-ion secondary battery comprising the negative electrode plate has high energy density and can have better performance in the over-discharge test.

Additionally, the average volume distribution particle size Dv50 refers to a particle size corresponding to a cumulative volume distribution percentages of the negative electrode active material and the metal powder each reaching 50%. In the present application, the volume average particle size Dv50 of the negative electrode active material and the metal powder may be determined using a laser diffraction particle size analysis method. For example, the determination can be made with reference to the standard GB/T 19077-2016 using a laser particle size analyzer (e.g. Malvern Master Size 3000).

In addition, the secondary battery, battery module, battery pack, and power consuming device of the present application will be described below by appropriately referring to the accompanying drawings.

In one embodiment of the present application, a secondary battery is provided.

Typically, a secondary battery comprises a positive electrode plate, a negative electrode plate, an electrolyte and a separator. During the charge/discharge process of the battery, active ions are intercalated and de-intercalated back and forth between the positive electrode plate and the negative electrode plate. The electrolyte is located between the positive electrode plate and the negative electrode plate and functions for ionic conduction. The separator is provided between the positive electrode plate and the negative electrode plate, and mainly prevents the positive and negative electrodes from short-circuiting and enables ions to pass through.

[Positive Electrode Plate]

The positive electrode plate comprises a positive electrode current collector and a positive electrode film layer provided on at least one surface of the positive electrode current collector, the positive electrode film layer comprising a positive electrode active material.

As examples, the positive electrode current collector has two surfaces opposite in its own thickness direction, and the positive electrode film layer is provided on either or both of the two opposite surfaces of the positive electrode current collector.

In some embodiments, the positive electrode current collector can be a metal foil or a composite current collector. For example, as a meta foil, an aluminum foil can be used. The composite current collector may comprise a polymer material substrate and a metal layer formed on at least one surface of the polymer material substrate. The composite current collector can be formed by forming a metal material (aluminum, aluminum alloys, nickel, nickel alloys, titanium, titanium alloys, silver and silver alloys, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may include at least one of the following materials: lithium-containing phosphates of olivine structure, lithium transition metal oxides and their respective modified compounds. However, the present application is not limited to these materials, and other conventional materials that can be used as positive electrode active materials for batteries may also be used. These positive electrode active materials may be used alone or in combination of two or more. Among them, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$) (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$), lithium nickel cobalt aluminum oxide (e.g. $LiNi_{0.85}Co_{0.15}Al_{0.05}O_2$), and modified compounds thereof, and the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive electrode film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer may optionally comprise a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: the above-mentioned components for preparing the positive electrode plate, such as positive electrode active material, conductive agent, binder and any other components, are dispersed in a solvent (e.g. N-methylpyrrolidone) to form a positive electrode slurry; and the positive electrode slurry is coated onto a positive electrode current collector, and is then subjected to procedures such as drying and cold pressing, so as to obtain the positive electrode plate.

[Negative Electrode Plate]

The negative electrode plate is the negative electrode plate of the first aspect of the present application.

[Electrolyte]

The electrolyte is located between the positive electrode plate and the negative electrode plate and functions for ionic conduction. The type of the electrolyte is not specifically limited in the present application, and can be selected according to actual requirements. For example, the electrolyte may be liquid, gel or all solid.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesufonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane dimethyl sulfone, ethyl methyl sulfone, and diethyl sulfone.

In some embodiments, the electrolyte solution may optionally comprise an additive. For example, the additive may include a negative electrode film-forming additive, a positive electrode film-forming additive, and also an additive that can improve certain performances of the battery, such as an additive that improves the overcharge performance of the battery, or an additive that improves the high-temperature performance or low-temperature performance of the battery.

[Separator]

In some embodiments, the secondary battery further comprises a separator. The type of the separator is not particularly limited in the present application, and any well-known porous-structure separator with good chemical stability and mechanical stability may be selected.

In some embodiments, the material of the separator can be selected from at least one of glass fibers, a non-woven fabric, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

In some embodiments, an electrode assembly may be formed by a positive electrode plate, a negative electrode plate and a separator by a winding process or a laminating process.

In some embodiments, the secondary battery may comprise an outer package. The outer package can be used to encapsulate the above-mentioned electrode assembly and electrolyte.

In some embodiments, the outer package of the secondary battery can be a hard shell, for example, a hard plastic shell, an aluminum shell, a steel shell, etc. The outer package of the secondary battery may also be a soft bag, such as a pouch-type soft bag. The material of the soft bag may be plastics, and the examples of plastics may include polypropylene, polybutylene terephthalate, and polybutylene succinate, etc.

The shape of the secondary battery is not particularly limited in the present application, and may be cylindrical, square or of any other shape. For example, FIG. 1 shows a secondary battery 5 with a square structure as an example.

Figure 2:
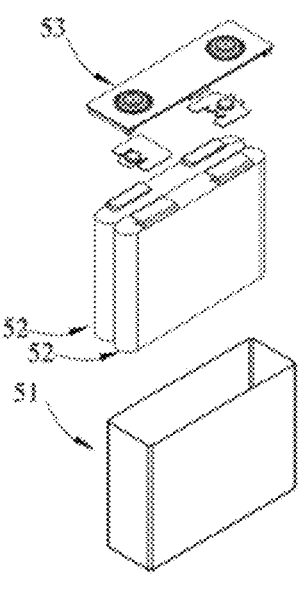
FIG. 2 is an exploded view of the secondary battery according to the embodiment of the present application as shown in FIG. 1.

In some embodiments, referring to FIG. 2, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can form an electrode assembly 52 by a winding process or a lamination process. The electrode assembly 52 is encapsulated in the accommodating cavity. An electrolyte solution is infiltrated into the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

FIG. 3 shows a battery module 4 as an example. Referring to FIG. 3, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above-mentioned battery module may also be assembled into a battery pack, the number of battery modules contained in the battery pack may be one or more, and the specific number can be selected by those skilled in the art according to the application and capacity of the battery pack.

FIG. 4 and FIG. 5 show a battery pack 1 as an example. Referring to FIG. 4 and FIG. 5, the battery pack 1 may comprise a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

In addition, the present application further provides a power consuming device. The power consuming device comprises at least one of the secondary battery, battery module, or battery pack provided by the present application. The secondary battery, battery module or battery pack may be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

For the power consuming device, the secondary battery, battery module or battery pack can be selected according to the usage requirements thereof.

Figure 6:
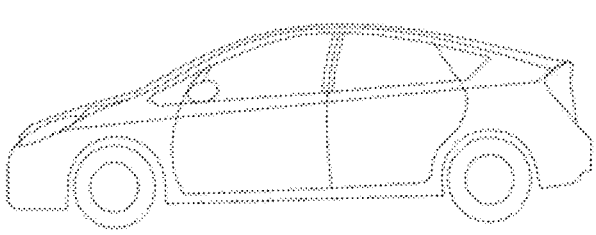
FIG. 6 is a schematic diagram of a power consuming device using a secondary battery according to an embodiment of the present application as a power source.

FIG. 6 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

As another example, the device may be a mobile phone, a tablet, a laptop computer, etc. The device is generally required to be thin and light, and may use a secondary battery as a power source.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

Example 1

A mixture of a metal Mn powder and a silicon-based material, a conductive carbon Super P, a thickener sodium carboxymethyl cellulose CMC, and a binder SBR were dissolved in deionized water in a weight ratio of 96:1:1.2:1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Mn powder was 10 μm, the Dv50 of the SiO was 4 μm, and the Dv50 of the graphite was 13 μm, and in the silicon-based material, the proportion by weight of the graphite was 70% and the proportion by weight of the SiO was 30%. Relative to the total weight of the silicon-based material and the metal Mn powder, the ratio by weight of the silicon-based material to the metal Mn powder is 85:15.

Example 2

A mixture of a metal Mn powder and a silicon-based material, a conductive carbon Super P, a thickener sodium carboxymethyl cellulose CMC, and a binder SBR were dissolved in deionized water in a weight ratio of 96:1:1.2:1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Mn powder was 20 μm, the Dv50 of the SiO was 4 μm, and the Dv50 of the graphite was 13 μm, and in the silicon-based material, the proportion by weight of the graphite was 70% and the proportion by weight of the SiO was 30%. Relative to the total weight of the silicon-based material and the metal Mn powder, the ratio by weight of the silicon-based material to the metal Mn powder is 90:10.

Example 3

A mixture of a metal Mn powder and a silicon-based material, a conductive carbon Super P, a thickener sodium carboxymethyl cellulose CMC, and a binder SBR were dissolved in deionized water in a weight ratio of 96:1:1.2:1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Mn powder was 5 μm, the Dv50 of the SiO was 4 μm, and the Dv50 of the graphite was 13 μm, and in the silicon-based material, the proportion by weight of the graphite was 70% and the proportion by weight of the SiO was 30%. Relative to the total weight of the silicon-based material and the metal Mn powder, the ratio by weight of the silicon-based material to the metal Mn powder is 90:10.

Example 4

A mixture of a metal Mn powder and a silicon-based material, a conductive carbon Super P, a thickener sodium carboxymethyl cellulose CMC, and a binder SBR were dissolved in deionized water in a weight ratio of 96:1:1.2:1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Mn powder was 5 μm, the Dv50 of the SiO was 4 μm, and the Dv50 of the graphite was 13 μm, and in the silicon-based material, the proportion by weight of the graphite was 70% and the proportion by weight of the SiO was 30%. Relative to the total weight of the silicon-based material and the metal Mn powder, the ratio by weight of the silicon-based material to the metal Mn powder is 90:10.

Example 5

A mixture of a metal Fe powder and a silicon-based material, a conductive carbon Super P, a thickener sodium carboxymethyl cellulose CMC, and a binder SBR were dissolved in deionized water in a weight ratio of 96:1:1.2:1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Fe powder was 10 μm, the Dv50 of the SiO was 4 μm, and the Dv50 of the graphite was 13 μm, and in the silicon-based material, the proportion by weight of the graphite was 70% and the proportion by weight of the SiO was 30%. Relative to the total weight of the silicon-based material and the metal Fe powder, the ratio by weight of the silicon-based material to the metal Fe powder is 90:10.

Example 6

A mixture of a metal Co powder and a silicon-based material, a conductive carbon Super P, a thickener sodium carboxymethyl cellulose CMC, and a binder SBR were dissolved in deionized water in a weight ratio of 96:1:1.2:1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Co powder was 5 μm, the Dv50 of the SiO was 4 μm, and the Dv50 of the graphite was 13 μm, and in the silicon-based material, the proportion by weight of the graphite was 70% and the proportion by weight of the SiO was 30%. Relative to the total weight of the silicon-based material and the metal Co powder, the ratio by weight of the silicon-based material to the metal Co powder is 95:5.

Example 7

A mixture of a metal Cr powder and a silicon-based material, a conductive carbon Super P, a thickener sodium carboxymethyl cellulose CMC, and a binder SBR were dissolved in deionized water in a weight ratio of 96:1:1.2:1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Cr powder was 5 μm, the Dv50 of the SiO was 4 μm, and the Dv50 of the graphite was 13 μm, and in the silicon-based material, the proportion by weight of the graphite was 70% and the proportion by weight of the SiO was 30%. Relative to the total weight of the silicon-based material and the metal Cr powder, the ratio by weight of the silicon-based material to the metal Cr powder is 95:5.

Comparative Example 1

A silicon-based material, a conductive carbon Super P, a thickener sodium carboxymethyl cellulose CMC, and a binder SBR were dissolved in deionized water in a weight ratio of 96:1:1.2:1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the SiO was 4 µm, and the Dv50 of the graphite was 13 µm, and in the silicon-based material, the proportion by weight of the graphite was 70% and the proportion by weight of the SiO was 30%.

Comparative Example 2

A mixture of a metal Mn powder and a silicon-based material, a conductive carbon Super P, a thickener sodium carboxymethyl cellulose CMC, and a binder SBR were dissolved in deionized water in a weight ratio of 96:1:1.2: 1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Mn powder was 10 µm, the Dv50 of the SiO was 4 µm, and the Dv50 of the graphite was 13 µm, and in the silicon-based material, the proportion by weight of the graphite was 70% and the proportion by weight of the SiO was 30%. Relative to the total weight of the silicon-based material and the metal Mn powder, the ratio by weight of the silicon-based material to the metal Mn powder is 98:2.

Comparative Example 3

A mixture of a metal Mn powder and a silicon-based material, a conductive carbon Super P, a thickener sodium carboxymethyl cellulose CMC, and a binder SBR were dissolved in deionized water in a weight ratio of 96:1:1.2: 1.8, and stirred to obtain a homogeneous negative electrode slurry; and the slurry was single-side coated onto the surface of a copper foil substrate, followed by drying and roll pressing, to obtain a negative electrode plate.

Herein, the Dv50 of the metal Mn powder was 20 µm, the Dv50 of the SiO was 4 µm, and the Dv50 of the graphite was 13 µm, and in the silicon-based material, the proportion by weight of the graphite was 70% and the proportion by weight of the SiO was 30%. Relative to the total weight of the silicon-based material and the metal Mn powder, the ratio by weight of the silicon-based material to the metal Mn powder is 70:30.

Relevant parameters of the negative electrode plates in Examples 1 to 7 and Comparative examples 1 to 3 mentioned above are shown in Table 1.

TABLE 1

Relevant parameters of negative electrode plates in
Examples 1 to 7 and Comparative examples 1 to 3

| | Metal powder | Silicon-based material | SiO:graphite (wt:wt) | Silicon-based material:metal powder (wt:wt) | Metal powder Dv50 | Metal-to-lithium electrode potential |
|---|---|---|---|---|---|---|
| Comparative example 1 | / | SiO + graphite | 30:70 | 100:0 | / | None |
| Comparative example 2 | Mn | SiO + graphite | 30:70 | 98:2 | 10 µm | 1.9 V |
| Comparative example 3 | Mn | SiO + graphite | 30:70 | 70:30 | 20 µm | 1.9 V |
| Example 1 | Mn | SiO + graphite | 30:70 | 85:15 | 10 µm | 1.9 V |
| Example 2 | Mn | SiO + graphite | 30:70 | 90:10 | 20 µm | 1.9 V |
| Example 3 | Mn | SiO + graphite | 30:70 | 90:10 | 5 µm | 1.9 V |
| Example 4 | Fe | SiO + graphite | 30:70 | 95:5 | 10 µm | 2.6 V |
| Example 5 | Fe | SiO + graphite | 30:70 | 90:10 | 10 µm | 2.6 V |
| Example 6 | Co | SiO + graphite | 30:70 | 95:5 | 5 µm | 2.7 V |
| Example 7 | Cr | SiO + graphite | 30:70 | 95:5 | 5 µm | 2.1 V |

In addition, the negative electrode plates obtained in Examples 1 to 7 and Comparative Examples 1 to 3 mentioned above were respectively prepared into secondary batteries as follows, and performance tests were carried out. The test results are as shown in Table 2 below.

(1) Preparation of Secondary Battery

A positive electrode active material and a conductive agent acetylene black and a binder polyvinylidene fluoride (PVDF) were well stirred and uniformly mixed in a weight ratio of 94:3:3 in a N-methylpyrrolidone solvent system, and the mixture was coated onto an aluminum foil, followed by drying and cold pressing, to obtain a positive electrode plate.

A negative electrode plate was selected from the negative electrode plates in the examples and comparative examples mentioned above.

A porous polymeric thin film made of polyethylene (PE) was used as a separator. The positive electrode plate, the separator and the negative electrode plate were stacked in sequence, such that the separator was located between the positive electrode and the negative electrode to play a role of isolation, and the stack was wound to obtain a bare cell. The bare cell was placed in an outer package, and an electrolyte solution was injected, followed by encapsulation, to obtain the secondary battery using the positive electrode plate in each of the examples and comparative examples.

(4) Test of Initial Discharge Capacity of Secondary Battery

Each of the secondary batteries prepared above was allowed to stand for 39 min in a constant temperature environment at 25° C., discharged at ⅓ C to 2.5 V, allowed to stand for 30 min, charged at ⅓ C to 4.25 V, then charged with a constant voltage at 4.25 V to a current ≤0.05 C, allowed to stand for 30 min, and then discharged at ⅓ C to 2.5 V, and the discharge capacity at this time was the initial discharge capacity, marked as D0.

(2) Over-Discharge Test of Secondary Battery

The secondary battery in each of the examples and comparative examples mentioned above was subjected to an over-discharge test according to the GB38031-2020 test method by using a BT-2000-type battery performance tester (manufacturer: Albin, USA), and the minimum reverse voltage was read: the secondary battery was fully charged with a constant current at 0.33 C rate to 4.25 V, and then charged with a constant voltage to 0.05 C, allowed to stand for 1 h, discharged at 1 C rate for 90 min, and observed at room temperature for 1 h. If the battery did not burn or explode, the battery was considered to have passed the over-discharge test.

TABLE 2

| Performance test results of Examples 1 to 7 and Comparative examples 1 to 3 | | | | |
|---|---|---|---|---|
| | Initial discharge capacity Ah | Minimum reverse voltage | Short circuit | Over-discharge test |
| Comparative example 1 | 200 | −32.7 V | No | No |
| Comparative example 2 | 199 | −32.7 V | No | No |
| Comparative example 3 | 184 | −0.6 V | Yes | Yes |
| Example 1 | 191 | −0.6 V | Yes | Yes |
| Example 2 | 195 | −0.6 V | Yes | Yes |
| Example 3 | 195 | −0.6 V | Yes | Yes |
| Example 4 | 197 | −1.0 V | Yes | Yes |
| Example 5 | 195 | −1.0 V | Yes | Yes |

TABLE 2-continued

| Performance test results of Examples 1 to 7 and Comparative examples 1 to 3 | | | | |
|---|---|---|---|---|
| | Initial discharge capacity Ah | Minimum reverse voltage | Short circuit | Over-discharge test |
| Example 6 | 197 | −1.1 V | Yes | Yes |
| Example 7 | 197 | −0.9 V | Yes | Yes |

From the above results, it can be seen that since the negative electrode plates in Examples 1 to 7 all contain an appropriate amount of a silicon-based material and a metal powder, and the electrode potential of the metal powder to lithium is between 1.6 and 3.5 V, the batteries all have a good performance in the over-discharge test: the metal powder in the negative electrode plate is oxidized to cations, and then is subjected to reductive evolution on the surface of the positive electrode plate, so that the separator is pierced, causing a short circuit inside the secondary battery, which thus protects the secondary battery from burning due to continuous heating during the over-discharge test, thereby improving the safety performance of the secondary battery.

In contrast, since no metal powder with an electrode potential relative to lithium of between 1.6 and 3.5 V is added in Comparative example 1, and a small amount of the above metal powder is added in Comparative example 2, the secondary batteries in Comparative example 1 and Comparative example 2 fail to form a short circuit inside the secondary batteries, the minimum reverse voltage is up to 32.7 V, and continuous heat release occurs inside the battery, which thus fails to protect the secondary battery, thereby passing the over-discharge test. The secondary battery in Comparative example 3 also passes the over-discharge test. However, the content of the metal powder in the negative electrode plate is too high, so that the gram capacity of the secondary battery may be sacrificed and thus the energy density of the secondary battery is affected.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

The invention claimed is:

1. A negative electrode plate comprising a current collector and a coating applied to at least one surface of the current collector, the coating comprising a negative electrode active material and a metal powder, wherein an electrode potential of the metal powder in the coating relative to lithium is between 1.6 and 3.5 V, the negative electrode active material is a silicon-based material, and the silicon-based material includes silicon oxide, wherein, relative to a total weight of the silicon-based material and the metal powder, a proportion by weight of the metal powder is 5 to 20% and a proportion by weight of the silicon-based material is 80 to 95%, and wherein the metal powder is Ga, Tl, In, Sn, or Pb.

2. The negative electrode plate according to claim 1, wherein the metal powder has a Dv50 of 20 nm to 20 μm.

3. The negative electrode plate according to claim 1, wherein, in the coating, a total proportion by weight of the silicon-based material and the metal powder is 90 to 99% relative to a total weight of the coating.

4. A secondary battery, comprising the negative electrode plate according to claim 1.

5. A battery module, comprising the secondary battery according to claim 4.

6. A battery pack, comprising the battery module according to claim 5.

7. The negative electrode plate according to claim 1, wherein, relative to the total weight of the silicon-based material and the metal powder, the proportion by weight of the metal powder is 5% to less than 15% and the proportion by weight of the silicon-based material is greater than 85% to 95%.

8. The negative electrode plate according to claim 1, wherein the metal powder has a Dv50 of 50 nm to 10 μm.

9. The negative electrode plate according to claim 1, wherein the metal powder is Ga, Tl, In, or Pb.

10. The negative electrode plate according to claim 1, wherein, relative to the total weight of the silicon-based material and the metal powder, the proportion by weight of the metal powder is 5% to less than 10% and the proportion by weight of the silicon-based material is greater than 90% to 95%.

\* \* \* \* \*